United States Patent [19]

Kyriakis

[11] Patent Number: 5,008,514
[45] Date of Patent: Apr. 16, 1991

[54] METHOD AND APPARATUS FOR HEATING A METALLIC ELONGATED PRODUCT

[75] Inventor: John Kyriakis, High Wycombe, Great Britain

[73] Assignee: Beta Instrument Company Limited, Buckinghamshire, England

[21] Appl. No.: 459,239

[22] Filed: Dec. 29, 1989

[51] Int. Cl.⁵ ............................ C21D 9/62; H05B 1/00
[52] U.S. Cl. ....................................... 219/155; 219/50
[58] Field of Search .................................. 219/50, 155

[56] References Cited

U.S. PATENT DOCUMENTS

| | | | |
|---|---|---|---|
| 2,064,589 | 12/1936 | Convers | 219/155 |
| 3,182,167 | 5/1965 | McBrien | 219/155 |
| 3,307,015 | 2/1967 | Hagiwara | 219/155 |
| 4,117,295 | 9/1978 | Beach | 219/155 |
| 4,118,617 | 10/1978 | Moreau | 219/155 |

FOREIGN PATENT DOCUMENTS 2124660A 2/1984 United Kingdom .

Primary Examiner—Clifford C. Shaw
Attorney, Agent, or Firm—Lowe, Price, LeBlanc, Becker & Shur

[57] ABSTRACT

Induction heating is used to heat a moving strip (4) of non-ferrous material by causing it to form a short-circuited loop acting as the secondary winding of a transformer (1), the loop passing over pulleys (6, 9, 5 or 16). In one arrangement, one of the pulleys (16) has a double groove and the strip (4) passes over one groove (18), around another of the pulleys (19) and back to the other groove (20) of the double grooved pulley (16). This enables the strip to enter or leave the inside of the loop without colliding with the other side of the loop. In an alternative arrangement, the strip enters or leaves the inside of the loop at an angle to the plane of the loop and is prevented from contacting the other side of the loop by an insulating spacer (7).

13 Claims, 2 Drawing Sheets

METHOD AND APPARATUS FOR HEATING A METALLIC ELONGATED PRODUCT

BACKGROUND OF THE INVENTION

Induction heating is often used for heating products. Elongated metallic products can be passed through an induction coil for heating.

GB-A-2124660 discloses a method for annealing non-ferrous strip material by passing the strip around a pair of spaced pulleys and effecting a short circuit between incoming and outgoing strip material to form a closed electrical loop of strip material moving around the pulleys. In that specification, the incoming and outgoing strip material are in contact at one of the pulleys, being located in the same single groove of the pulley. A length of material is caused to traverse the loop by driving the material through friction from one of the pulleys. The incoming strip of material travels outside the plane of the loop and is deflected into that plane by a series of additional pulleys arranged in a spiral before it contacts the loop.

This method of applying drive to and feeding material into the loop is sometimes not satisfactory and the present invention has been devised to provide an improved driving arrangement and/or an improved means of feeding strip into the loop.

SUMMARY OF THE INVENTION

According to one aspect of the invention there is provided apparatus heating a metallic elongated product, comprising: a plurality of pulleys for movably guiding a length of the product over a path including a closed loop, one of said pulleys having a double groove, another of said pulleys being located adjacent said double grooved pulley to receive said product from one groove thereof and to return it to the other groove thereof.

According to another aspect of the invention, there is provided apparatus heating a metallic elongated product, comprising: a plurality of pulleys for forming a closed loop of said product, the loop being closed by spaced regions of the product in the same groove of one of said pulleys, an insulating spacing member arranged to prevent contact between a portion of said closed loop and a portion of said product upstream or downstream of the closed loop, and a transformer a secondary winding of which includes the material disposed over said closed loop.

According to a further aspect of the invention, there is provided a method for heating a metallic elongated product, comprising the steps of passing a length of the product over a plurality of pulleys to form a closed loop, one of said pulleys having a double groove, the loop having a portion which extends from double-grooved groove of said one pulley to another pulley and back to the other groove of said double-grooved pulley, and inducing a current in said closed loop.

BRIEF DESCRIPTION OF THE DRAWINGS

A preferred embodiment of the invention will now be described with reference to the accompanying drawings, in which.

DESCRIPTION OF THE PREFERRED EMBODIMENT

Figure 1:
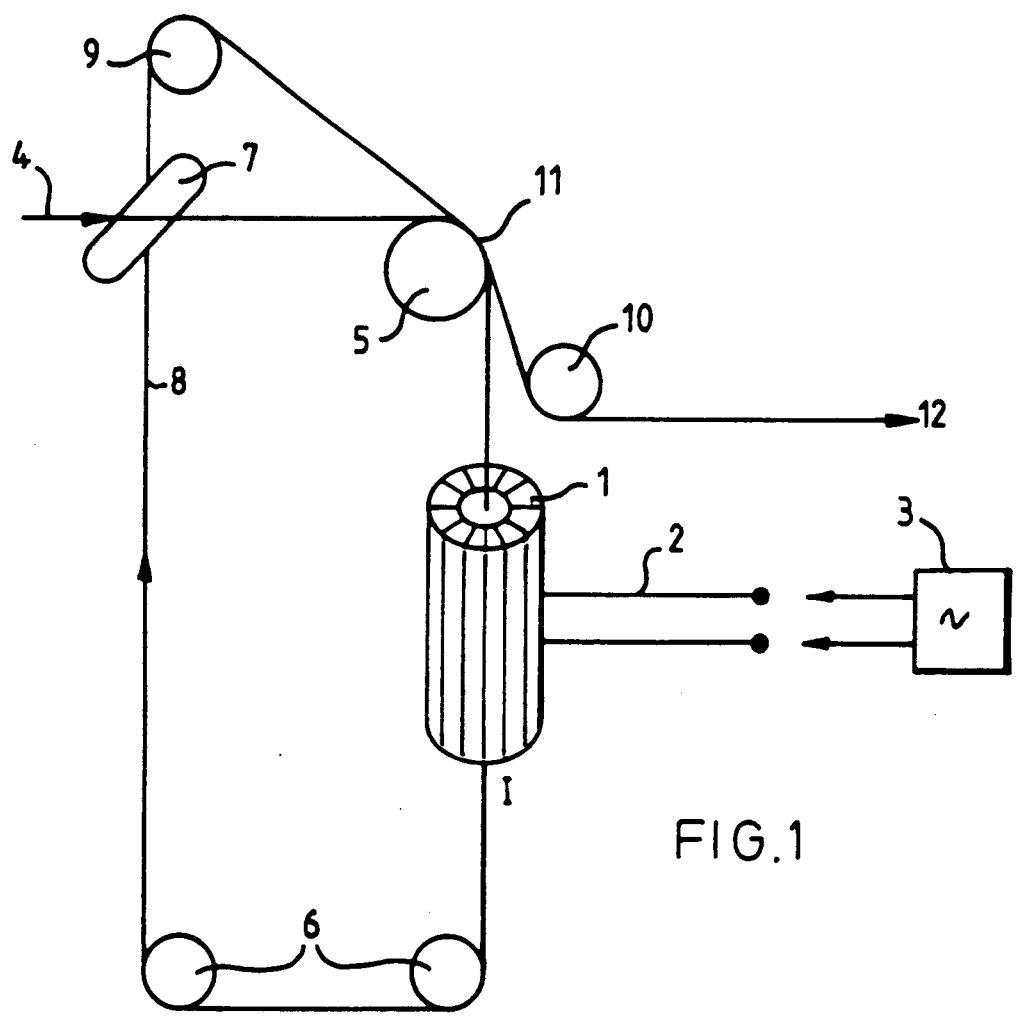
FIG. 1 is a diagram of an inductive loop heating apparatus.
Figure 3:
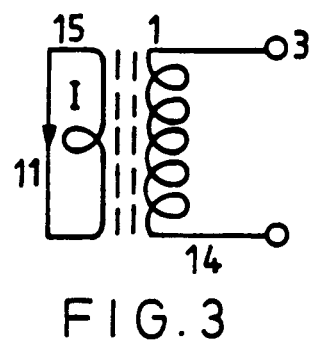
FIG. 3 is an equivalent circuit of the apparatus of FIG. 1.

In the apparatus as illustrated in FIGS. 1 and 3, an incoming wire strip 4 is turned through a right angle around an insulating pulley 5 to pass along the axis of an induction coil 1. The direction of motion of strip is then reversed by passing the strip over two insulating pulleys 6 to pass around a further insulating pulley 9 and re-enter a groove 13 of the pulley 5 to contact the incoming strip, passing thence around insulating deflecting pulley 10 to the output of the apparatus.

Figure 2:
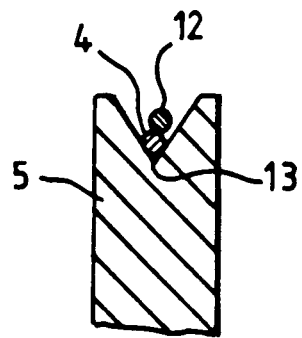
FIG. 2 is a diametral section through a pulley in the apparatus of FIG. 1.

As can be seen in FIG. 2, insultating pulley 5 has a groove 13, at the base of which the incoming wire strip 4 is located with the outgoing wire strip 12 passing between the pulleys 9 and 10 shown on top of and in contact with the incoming strip 4, thus completing an electrical contact between the incoming and outgoing strips 4 and 12 to complete the loop.

The induction coil is supplied with alternating power from a source 3 through a primary winding 2. The loop formed by the incoming and outgoing wire strips 4 and 12 passing over pulleys 5, 6 and 9 forms the secondary winding of the induction coil 1. The alternating voltage from source 3 induces a high current in the secondary loop to raise the wire temperature due to its inherent resistance, and the temperature of the outgoing wire 12 is controlled by adjusting the voltage supplied by the source. The closing of the secondary winding is achieved simply by contact between the turns of the wire in the groove 13 of insulating pulley and not through the pulleys. The pulleys which are formed of an insulating material for example a ceramic material such as glass.

The loop of product lies in a place and the outgoing strip after passing around the loop also travels in this plane. In order to feed the incoming strip into the loop on the inside of the outgoing strip without colliding with the other side of the loop, the incoming strip crosses the other side of the loop outside its plane and then is deflected into the plane at the pulley 5. To prevent contact between the incoming strip and the loop at the crossing, an insulating sliding bracket 7 is provided to keep the incoming wire strip 4 away from the strip passing from the second pulley 6 to the pulley 9, leaving the contact between the incoming and outgoing strips 4 and 12 to be made at the pulley 5. There is thus a simple deflection in one direction at the bracket 7 and a reverse deflection at the pulley 5.

Figure 4:
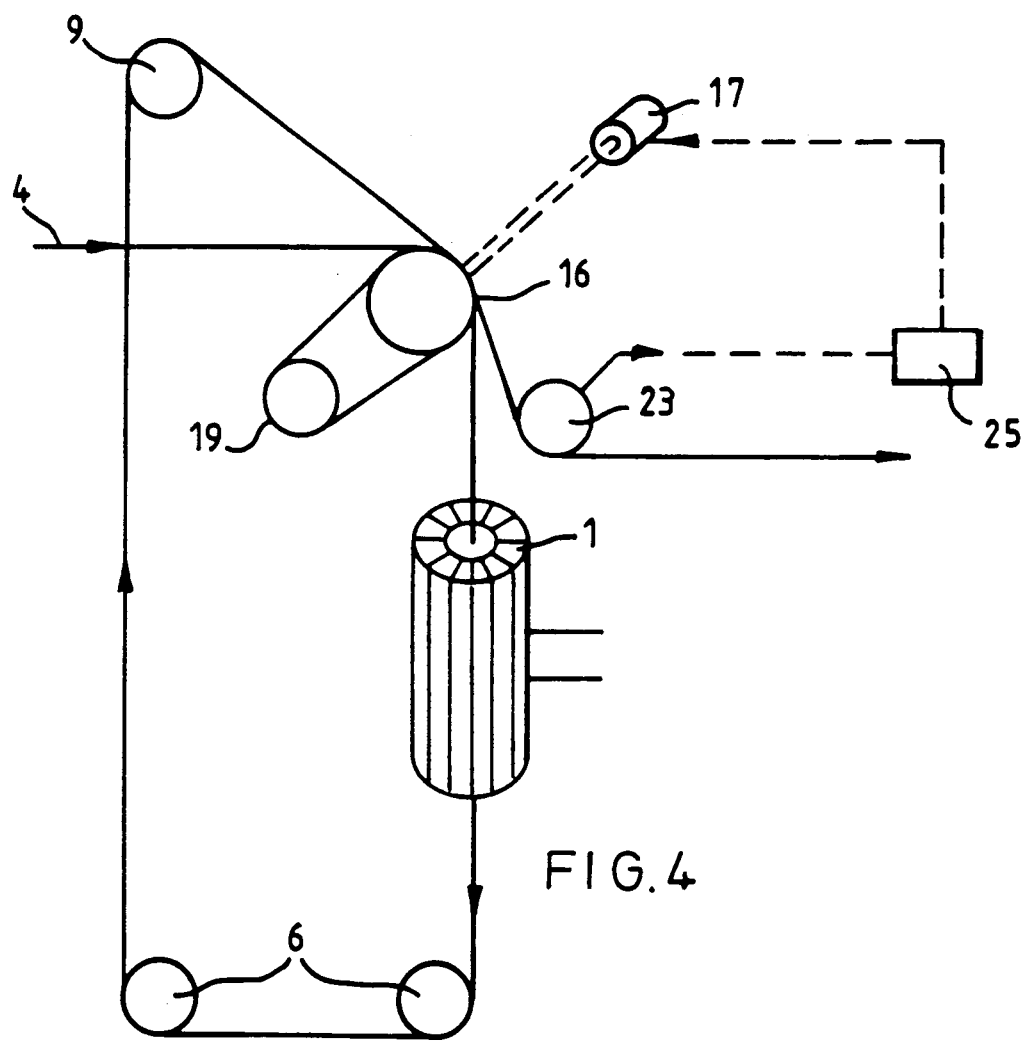
FIGS. 4 and 5 are, respectively, a diagram and diametral section of a modification of the apparatus of FIGS. 1 to 3.
Figure 5:
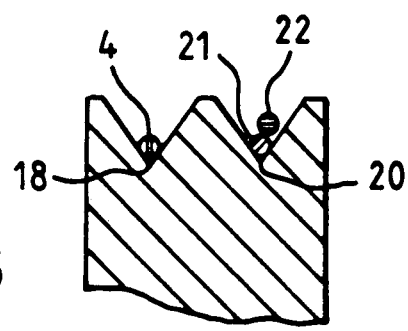

As best seen in FIGS. 4 and 5, in another preferred embodiment a driving pulley 16 replaces the pulley 5 of FIGS. 1 and 3 and has two grooves. The incoming strip 4 is located in the first groove and turns through about 135° before leaving the pulley 5 and travelling to an additional pulley 19. The strip then returns from the further pulley 19 to the second groove 20 of the pulley 16 where it turns through another 135° to travel along the axis of the coil 1. The strip 4 returning to the pulley 16 from the pulley 6 also lies in the second groove 20, on top of the incoming wire strip, thus completing the electrical contact between the incoming and outgoing strips to form the secondary winding of the induction coil.

In this embodiment, the incoming strip is in the plane of the first groove 18 of pulley 16 whereas the loop is in the plane of the second groove 20, the two planes being parallel and spaced. In this embodiment the deflection of the strip between the two planes occurs in its transit between the pully 16 and the pulley 19. The insulating bracket 7 is not instrumental in deflecting the strip and is not essential to prevent contact at the crossing, but may be provided as an additional precaution. The bracket 7 is not shown in FIG. 4.

A wire tension sensor is located at the final deflecting pulley 23 and feeds information to a control circuit 25 to control the torque generated by the servomotor 17 which drives the pulley 16.

It would be possible for the direction of travel of the strip to be reversed in either embodiment. While there have been described and illustrated only certain specific embodiments of the invention, it will be clear that variations in the details of the embodiments specifically illustrated and described herein may be made without departing from the true spirit and scope of the invention as defined in the appended claims.

I claim:

1. Apparatus heating a length of a metallic elongated product, comprising:
    a plurality of insulating pulleys for movably guiding a portion of the product over a path including a closed loop, one of said pulleys having a double groove, and another of said pulleys being located adjacent the double-grooved pulley to receive said product from one groove thereof and to return it to the other groove thereof; and
    a transformer, a secondary winding whereof comprises said product disposed over said closed loop.

2. Apparatus as claimed in claim 1, wherein:
    said pulleys are arranged so that said portion of product disposed over the closed loop forms a product loop that is closed by contact of spaced regions of the product guided in one of said grooves of said doubled-grooved pulley.

3. Apparatus as claimed in claim 2, wherein:
    said pulleys are arranged so that the product loop is closed by contact at spaced regions of the product guided in said other groove of said double-grooved pulley.

4. Apparatus as claimed in any one of claim 1, comprising:
    means for driving said double-grooved pulley.

5. Apparatus as claimed in claim 4, further comprising:
    means for sensing a tension in the elongated product; and
    means for controlling a driving means for driving the product in correspondence with said sensed tension.

6. Apparatus as claimed in claim 1, wherein:
    said pulleys are formed of electrically insulating material.

7. Apparatus as claimed in claim 6, wherein:
    said insulating material is a ceramic.

8. Apparatus as claimed in claim 6 wherein:
    said insulating material is a glass.

9. Apparatus heating a length of a metallic elongated product, comprising:
    a plurality of insulating pulleys for forming a closed moveable loop from a portion of the length of said product, the loop being closed by spaced portions of the product in the same groove of one of said pulleys;
    an insulating spacing member, arranged to prevent contact between a portion of said product forming said closed loop and a selected portion of said product disposed upstream or downstream of the closed loop; and
    a transformer, a secondary winding whereof comprises said portion of said product forming said closed loop.

10. Apparatus as claimed in claim 9, wherein:
    the loop lies in a plane and the spacing member is arranged to maintain said upstream or downstream portion out of said plane.

11. A method of heating a length of a metallic elongated product, comprising the steps of:
    passing said product over a plurality of insulating pulleys to movably form a closed loop, one of said pulleys having a double groove, the closed loop having a portion which extends from one groove of the double-grooved pulley to another pulley and back to the other groove of said double-grooved pulley; and
    inducing a current in the product disposed in said closed loop.

12. A method as claimed in claim 11, comprising the further step of;
    driving said product in said closed loop longitudinally by friction applied thereto from said double-grooved pulley.

13. A method as claimed in claim 11, comprising the further step of:
    driving the product over said loop by contacting spaced regions of said product at said other groove of said double-grooved pulley.

* * * * *